Patented July 27, 1943

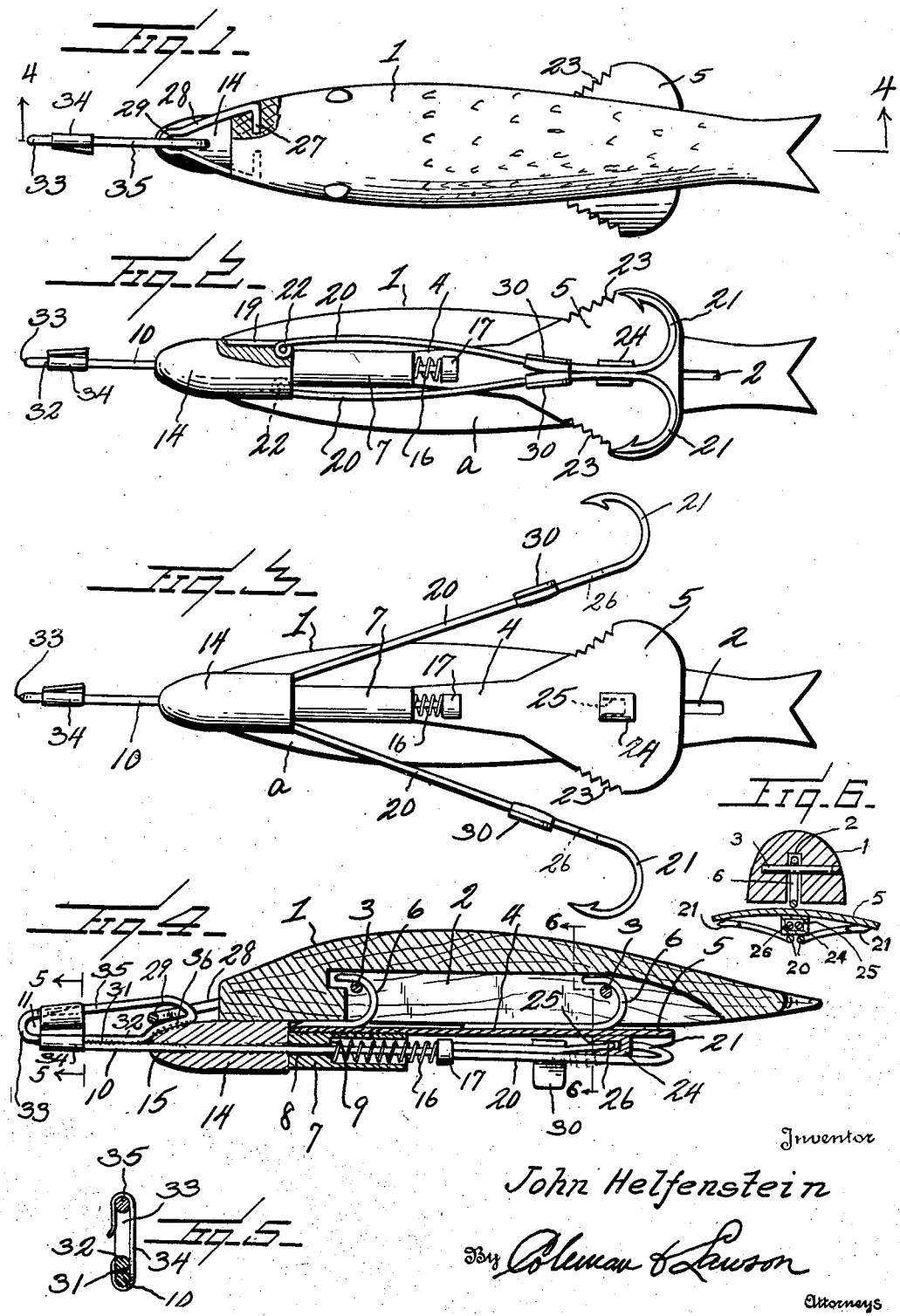

2,325,247

UNITED STATES PATENT OFFICE 2,325,247

COMBINATION FISHHOOK

John Helfenstein, Bismarck, N. Dak.

Application April 21, 1942, Serial No. 429,867

6 Claims. (Cl. 43—35)

This invention relates to a combination fish hook, and it is primarily an object of the invention to provide a device of this kind which can be used with equal facility for trolling and casting.

It is also an object of the invention to provide a hook of this kind which can be used with either a live or an artificial minnow, as may be preferred.

It is a further object of the invention to provide a device of this kind of a multiple or gang hook type, wherein several hooks are carried upon resilient shanks and held in a manner that when a fish strikes, the group of hooks will be released and the points or tines substantially instantaneously spread apart or are thrown outwardly to insure an effective engagement of the device within the mouth of the fish to insure catching of the same.

The invention has for a further object to provide a device of this kind of a multiple or gang type wherein the hooks are held together under tension in a group to be rapidly or violently thrown outward upon striking of the fish and wherein the device includes a weed guard so constructed and positioned as to facilitate the desired release of the hooks of the group when the fish strikes.

The invention consists in the details of construction and in the combination and arrangement of the several parts of my improved combination fish hook whereby certain important advantages are attained, as will be hereinafter more fully set forth.

In order that my invention may be better understood, I will now proceed to describe the same with reference to the accompanying drawing, wherein:

Figure 1 is a view in top plan, with a portion broken away, of a hook device constructed in accordance with an embodiment of my invention.

Figure 2 is a view in bottom plan with a portion broken away of the device as herein disclosed.

Figure 3 is a view in bottom plan of the device as herein embodied with the hooks in released or spread positions.

Figure 4 is a sectional view taken substantially on the line 4—4 of Figure 1, and Figure 5 is an enlarged sectional view taken substantially on the line 5—5 of Figure 4, looking in the direction of the arrows.

Figure 6 is a sectional view taken substantially on the line 6—6 of Figure 4.

As illustrated in the accompanying drawing, 1 denotes an elongated body of wood or other desired material designed in simulation of a minnow and which has a flat bottom face a. This body 1 is to be made of such size as desired and, of course, is to be colored or designed in accordance with the character of live minnow it is to simulate. This body 1 at substantially its transverse center is provided along its bottom flat face a with an elongated groove or slot 2 of material length and which slot at desired points spaced therealong and adjacent to its inner or base wall is intersected by pins 3 passing through the body 1.

Extending lengthwise of the flat face a is an elongated and relatively narrow plate 4 having its rear portion flared in an outward direction to provide a substantially flat tail or guard 5 which also constitutes a weed guard. This plate 4 at desired points spaced therealong has mounted on its back face the outstanding hook members 6, both facing forwardly. These members 6 are adapted to be received within the slot 2 and to engage over the pins 3 to hold the plate 4 to the body 1. This connection, as is believed to be clearly apparent from the accompanying drawings, can be accomplished by relative endwise shifting movement between the body 1 and plate 4.

The front end portion of the plate 4 has rigidly secured thereto the longitudinally disposed sleeve 7, the forward portion 8 of the bore of which is reduced to provide a rearwardly facing interior shoulder 9. Slidably disposed through this sleeve 7 is a shaft 10 of desired length and which is provided at its outer extremity with an eye 11 for the attachment of a fishing line.

Rigid with the shaft 10 and at the central portion thereof is a relatively long body 14. This body 14, as herein disclosed, is of circular cross section and has its forward end portion 15 somewhat tapered. The rear end of this body 14 is flat and is normally maintained in close contact with the adjacent or forward end of the sleeve 7 by an expansible member 16, herein disclosed as a coil spring, surrounding the shaft 10 and interposed between the shoulder 9 and an enlargement or head 17 carried by the inner end portion of the shaft.

Welded or otherwise securely anchored, as at 19, to the opposite side of the body 14 at the rear thereof are extremities of the rearwardly disposed elongated resilient shanks 20 terminating at their outer extremities in the hooks 21. These shanks 20 automatically spread apart or separate and to facilitate this action, the connected forward extremity of each of the shanks 20 is formed to provide a spring coil 22.

As is clearly illustrated in Figure 2, the shanks 20 are of such length as to have the hooks 21 confined within the rear part of the tail or guard 5 so that snagging is prevented. This tail or guard 5 is somewhat in the form of a V with its apex portion forwardly disposed and the side edges of the tail or guard 5 are provided with the saw teeth 23 to provide further means to prevent snagging and also to facilitate the functioning of the device when a fish strikes, as will be hereinafter more fully set forth.

The tail or guard 5 at substantially its axial center is provided with a depending block 24 provided with a socket 25 in its forward end and in which socket is adapted to be received a rearwardly extending spur 26 carried by each of the shanks 20. It is to be stated that this socket 25 is of such dimensions to receive the spur 26 of both of the shanks.

While in the accompanying drawing the invention is shown as embodying the use of an artificial minnow as comprised in the body 1, it is to be stated that if desired the minnow or body 1 may be omitted and the hooks 6 engaged directly with a live minnow of requisite size.

The forward end portion of the body 1, as herein disclosed, has pivotally connected therewith, as at 27, a forwardly directed yoke member 28 which is of a length to extend beyond the outer end of the body member 14. The forward portion 29 of this yoke member 28 is relatively narrow and disposed on a downward incline and provides a slot for a purpose to be hereinafter described.

In practice, the shanks 20 are retracted, as illustrated in Figure 2, with the spurs 26 thereof engaged within the socket 25 of the block 24, whereby the outer end portions of these shanks 20 and the hooks 21 thereof are held in close relation and within the field defined by the adjacent portion of the tail or guard 5. The spurs 26 are releasably held within the socket 25 by the expansible member 16 hereinbefore referred to. To facilitate the retraction of the shanks 20, together with the engaging of the spurs 26 within the socket 25, said shanks in their outer portions carry the depending wings 30 which can be readily engaged between the digits of a hand.

When the fish strikes, the plate 4 will be moved rearwardly a distance sufficient to release the spurs 26 from within the socket 25, whereupon the shanks 20 will at once separate or spread in a manner to forcibly separate the hooks and thus have the hooks engage within the mouth of a fish in a manner whereby any attempt to draw the hooks from within the mouth of the fish will merely result in forcing the points of the hooks into the flesh of the fish. This desired movement of the plate 4 upon striking of the fish is further facilitated by the tail or guard 5, together with the saw teeth 23 thereof.

Soldered, welded or otherwise rigidly connected, as at 31, along the shaft 10 is a wire-like strand 32 having its forward end portion 33 upwardly and rearwardly returned. The free extremity of the returned portion 33 and the adjacent portions of the shaft 10 and strand 32 are connected by a conventional guard plate 34 with which coacts in a well known manner the free pointed extremity of the resilient pin bar 35 which, as herein disclosed, is the forwardly disposed and reverted continuation of the strand 32. The pin bar 35 is spaced above the strand 32, as is clearly illustrated in the drawing, so that the pin bar 35 may be readily adjusted into either open or closed position after the fashion of a conventional safety pin. In the present embodiment of the invention, the rear portion of the strand 32 is continued over and suitably secured, as at 36, to the upper surface of the body 14 at the forward extremity thereof.

When the live bait is employed, not only the hook member 6, as hereinbefore stated, is engaged directly with the live minnow or other bait but the pin bar 35 is caused to penetrate through the bait and thus assure its effective maintenance in applied position and more particularly when casting.

While, as illustrated in the accompanying drawing, two hook members 6 are shown, it is to be stated that the forward hook member 6 can be omitted without affecting the efficiency of the device.

When the artificial body 1 is used, the pin bar 35 is disposed through the yoke member 28 and thus provide for further connection between the plate 4 and the body 1.

It is also to be pointed out that the returned portion 33 of the strand 32 coacts with the guard plate 34, in the present embodiment of my invention, to provide the eye 11 hereinbefore referred to.

From the foregoing description it is thought to be obvious that a combination fish hook constructed in accordance with my invention is particularly well adapted for use by reason of the convenience and facility with which it may be assembled and operated.

What I claim is:

1. A fishing device comprising an elongated member provided at its rear end with a transversely enlarged portion to provide a guard, a sleeve carried by the member, a shaft movable lengthwise through the sleeve, the outer portion of the shaft being provided with means to engage a line, means for constantly urging the shaft inwardly, resilient shanks operatively connected with the shaft and disposed rearwardly of the member, a block carried by the guard of the member and having a forwardly facing socket, and spurs carried by the shanks engaging within the socket of the block to hold the shanks retracted.

2. A fishing device comprising an elongated member provided at its rear end with a transversely enlarged portion to provide a guard, a sleeve carried by the member, a shaft movable lengthwise through the sleeve, the outer portion of the shaft being provided with means to engage a line, means for constantly urging the shaft inwardly, resilient shanks operatively connected with the shaft and disposed rearwardly of the member, a block engaged by the guard of the member and having a forwardly facing socket, spurs carried by the shanks engaging within the socket of the block to hold the shanks retracted, said guard being substantially V-shaped in form with its apex portion forwardly disposed, and hook carried by the outer extremities of the shanks, said hooks being confined within the area of the guard when retracted.

3. A fishing device comprising an elongated member provided at its rear end with a transversely enlarged portion to provide a guard, a sleeve carried by the member, a shaft movable lengthwise through the sleeve, the outer portion of the shaft being provided with means to engage a line, means for constantly urging the shaft inwardly, resilient shanks operatively connected with the shaft and disposed rearwardly of the member, a block carried by the guard of the member and having a forwardly facing socket, spurs carried by the shanks engaging within the socket of the block to hold the shanks retracted, an elongated body provided with a slot in the face thereof, the elongated member overlying the face of the body having the slot, parts intersecting the slots of the body, and elements carried by the elongated member to engage said parts for holding the elongated member to the body.

4. A fishing device comprising an elongated member provided at its rear end with a transversely enlarged portion to provide a guard, a sleeve carried by the member, a shaft movable lengthwise through the sleeve, the outer portion of the shaft being provided with means to engage a line, means for constantly urging the shaft inwardly, resilient shanks operatively connected with the shaft and disposed rearwardly of the member, a block carried by the guard of the member and having a forwardly facing socket, spurs carried by the shanks engaging within the socket of the block to hold the shanks retracted, attaching means carried by the member, and bait engaging means carried by the forward end portion of the shaft.

5. A fishing device comprising an elongated member provided at its rear end with a transversely enlarged portion to provide a guard, a sleeve carried by the member, a shaft movable lengthwise through the sleeve, the outer portion of the shaft being provided with means to engage a line, means for constantly urging the shaft inwardly, resilient shanks operatively connected with the shaft and disposed rearwardly of the member, a block carried by the guard of the member and having a forwardly facing socket, spurs carried by the shanks engaging within the socket of the block to hold the shanks retracted, attaching means carried by the member, and a pin bar carried by the forward portion of the shaft to provide bait engaging means.

6. A fishing device comprising an elongated member provided at its rear end with a transversely enlarged portion to provide a guard, a sleeve carried by the member, a shaft movable lengthwise through the sleeve, the outer portion of the shaft being provided with means to engage a line, means for constantly urging the shaft inwardly, resilient shanks operatively connected with the shaft and disposed rearwardly of the member, a block carried by the guard of the member and having a forwardly facing socket, spurs carried by the shanks engaging within the socket of the block to hold the shanks retracted, attaching means carried by the member, and a pin bar carried by the forward portion of the shaft to provide bait engaging means, said pin bar being disposed lengthwise of the shaft.

JOHN HELFENSTEIN.